United States Patent
Chen et al.

(10) Patent No.: US 12,339,576 B2
(45) Date of Patent: Jun. 24, 2025

(54) OPTICAL SYSTEM

(71) Applicant: TDK TAIWAN CORP., Taoyuan (TW)

(72) Inventors: Shu-Shan Chen, Taoyuan (TW);
Sin-Jhong Song, Taoyuan (TW);
Ko-Lun Chao, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 876 days.

(21) Appl. No.: 17/401,455

(22) Filed: Aug. 13, 2021

(65) Prior Publication Data

US 2022/0050297 A1    Feb. 17, 2022

Related U.S. Application Data

(60) Provisional application No. 63/065,865, filed on Aug. 14, 2020.

(51) Int. Cl.
*G03B 5/00* (2021.01)
*G02B 7/04* (2021.01)
(Continued)

(52) U.S. Cl.
CPC ............... *G03B 5/02* (2013.01); *G02B 7/04* (2013.01); *G02B 27/0093* (2013.01);
(Continued)

(58) Field of Classification Search
CPC .... G03B 5/02; G03B 3/10; G03B 2205/0046; G03B 2205/0061; G02B 7/04; G02B 27/0093; G02B 27/0172; G02B 27/646; G02B 27/014; G02B 2027/0178; G02B 27/0176; G02B 27/017; G02B 27/01; G02B 27/0101; G02B 27/0103; G02B 27/0149; G02B 27/0179; G02B 27/0189; G02B 2027/0105; G02B 2027/0107; G02B 2027/0109; G02B 2027/011;
(Continued)

(56) References Cited

U.S. PATENT DOCUMENTS 10,901,225 B1 * 1/2021 De Nardi ........... G02B 27/0093
2010/0118272 A1 * 5/2010 Iwasaki ..................... A61B 3/09
351/239

(Continued)

FOREIGN PATENT DOCUMENTS

CN    1940619 A    4/2007
CN    107340599 A    11/2017

OTHER PUBLICATIONS

Office Action issued on Apr. 25, 2025 for the corresponding Application No. 202110930609.9 in China; pp. 1-9.

*Primary Examiner* — Henry Duong
(74) *Attorney, Agent, or Firm* — Muncy, Geissler, Olds & Lowe, P.C.

(57) ABSTRACT

An optical system is provided. The optical system includes a fixed portion and a first optical assembly. The first optical assembly includes a first movable portion used for holding a first optical element, and a first driving assembly used for driving the first movable portion to move relative to the fixed portion. The fixed portion includes a first frame used for holding a second optical element, the first movable portion is movable relative to the fixed portion, and an image is projected to the second optical element.

20 Claims, 10 Drawing Sheets

(51) Int. Cl.
| | |
|---|---|
| *G02B 27/00* | (2006.01) |
| *G02B 27/01* | (2006.01) |
| *G02B 27/64* | (2006.01) |
| *G02C 7/08* | (2006.01) |
| *G02C 7/10* | (2006.01) |
| *G03B 3/10* | (2021.01) |
| *G03B 5/02* | (2021.01) |
| *H04N 23/68* | (2023.01) |

(52) U.S. Cl.
CPC ....... *G02B 27/0172* (2013.01); *G02B 27/646* (2013.01); *G02C 7/088* (2013.01); *G02C 7/10* (2013.01); *G03B 3/10* (2013.01); *H04N 23/68* (2023.01); *G02B 2027/014* (2013.01); *G02B 2027/0178* (2013.01); *G03B 2205/0046* (2013.01); *G03B 2205/0061* (2013.01)

(58) Field of Classification Search
CPC .... G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136; G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0181; G02B 2027/0183; G02B 2027/0185; G02B 2027/0187; G02B 2027/019; G02B 2027/0192; G02B 2027/0194; G02B 2027/0196; G02B 2027/0198; G02C 7/088; G02C 7/10; G02C 7/086; G02C 9/04; H04N 23/68
USPC ......................................................... 359/630
See application file for complete search history.

(56) References Cited

U.S. PATENT DOCUMENTS

| | | |
|---|---|---|
| 2012/0236030 A1 | 9/2012 | Border et al. |
| 2020/0249420 A1 | 8/2020 | Wu et al. |

* cited by examiner

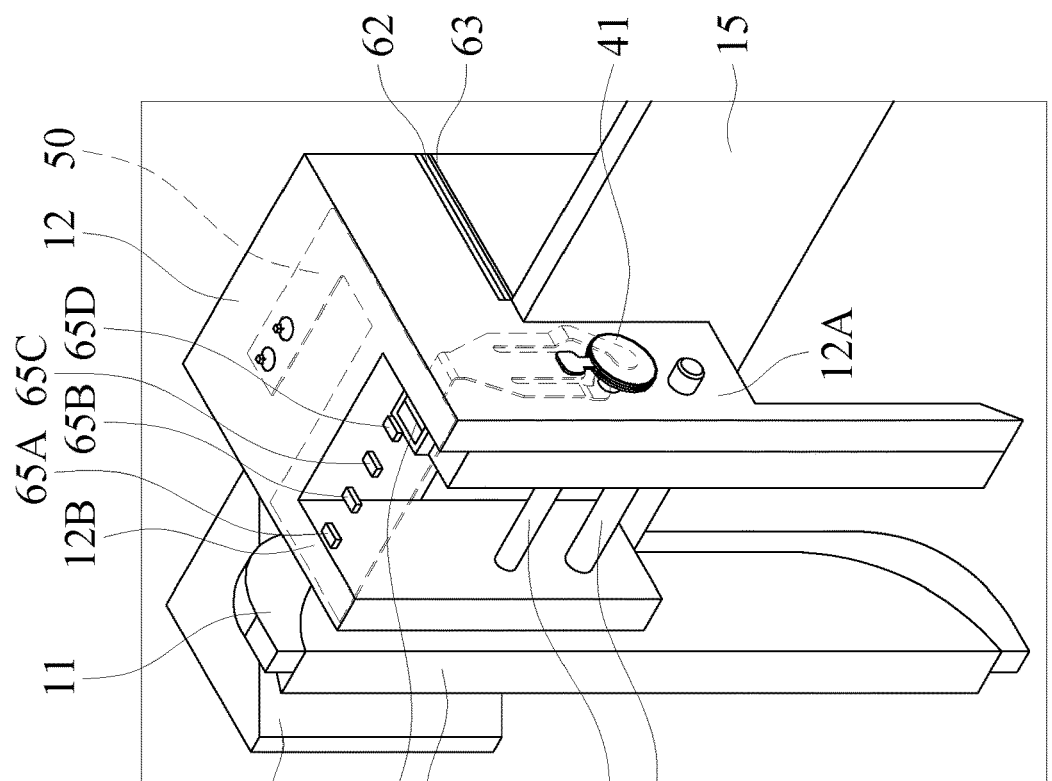
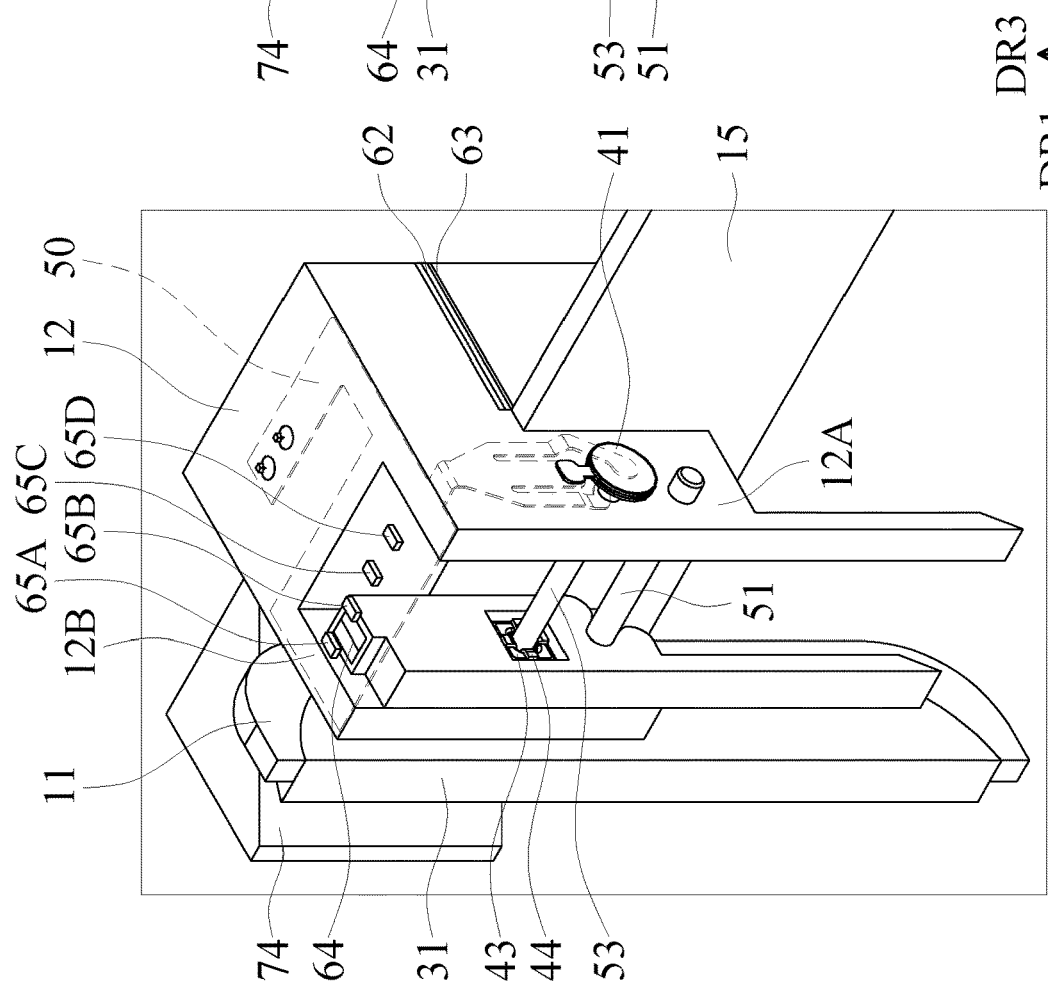
FIG. 3A
FIG. 3B

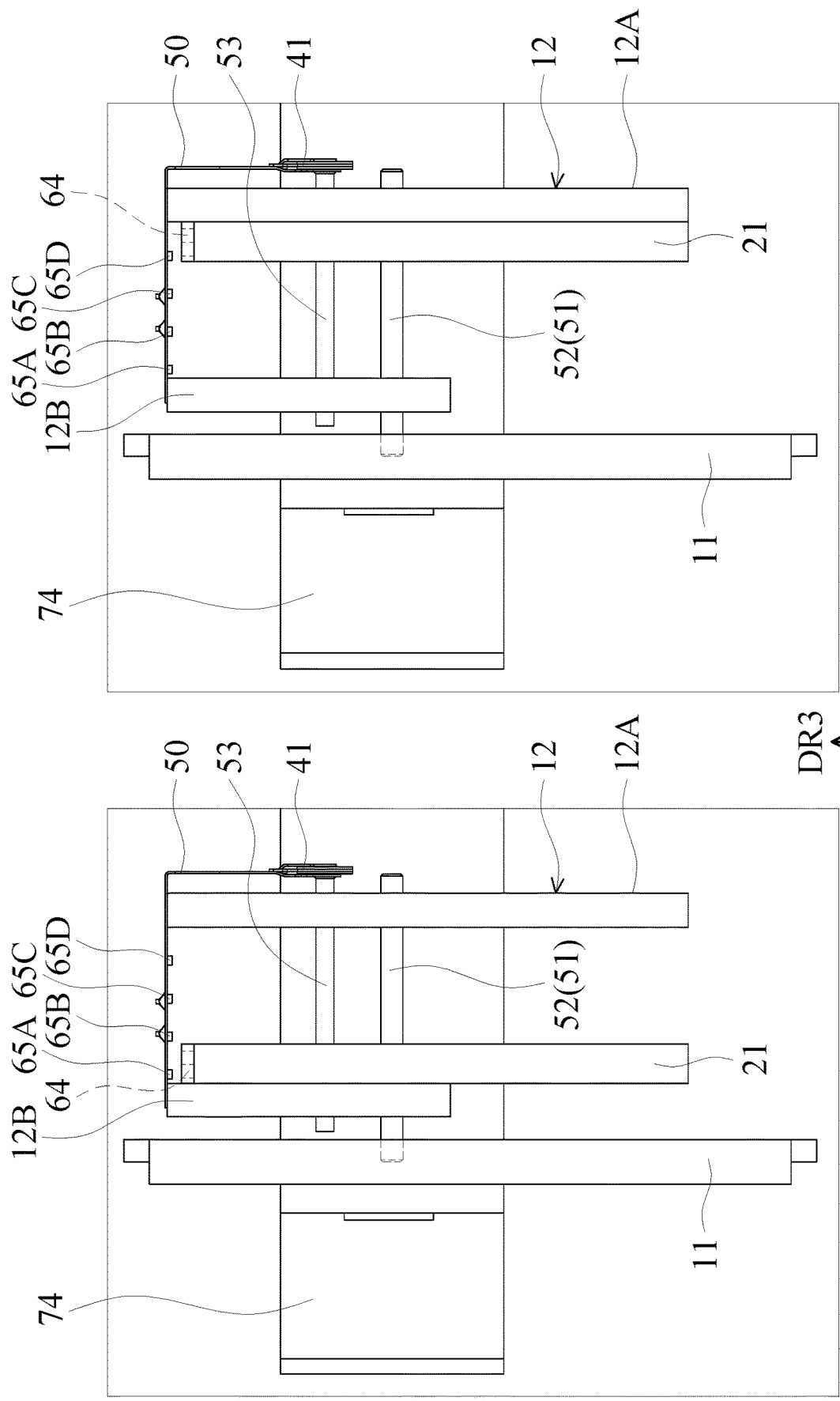

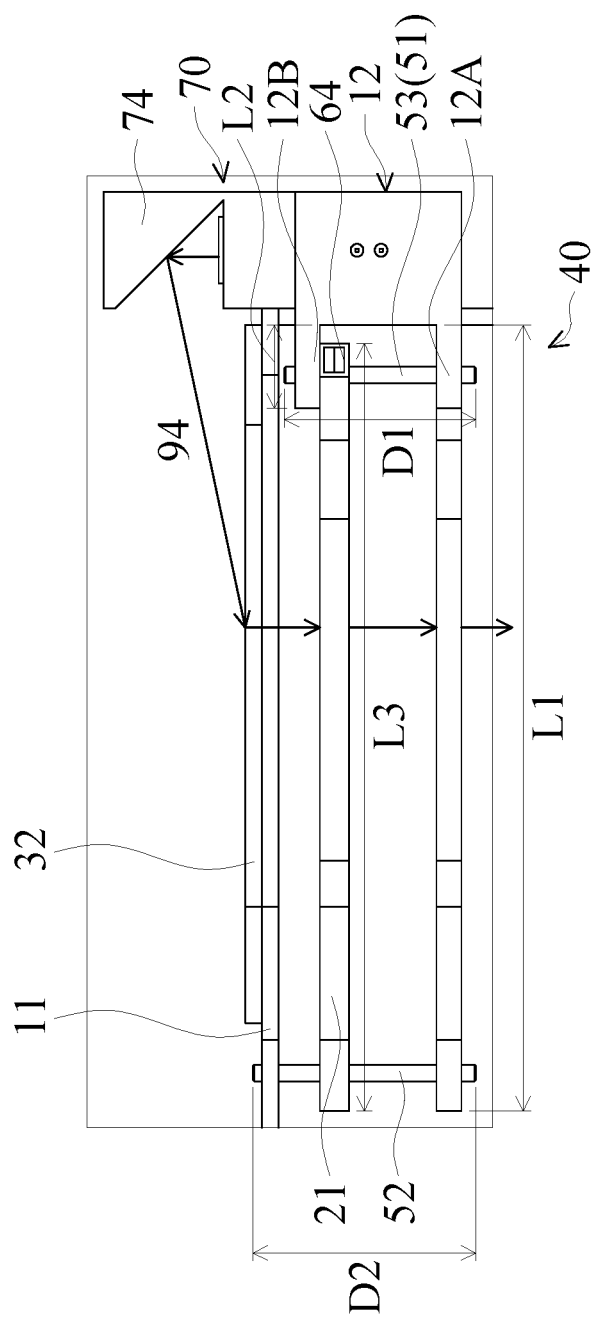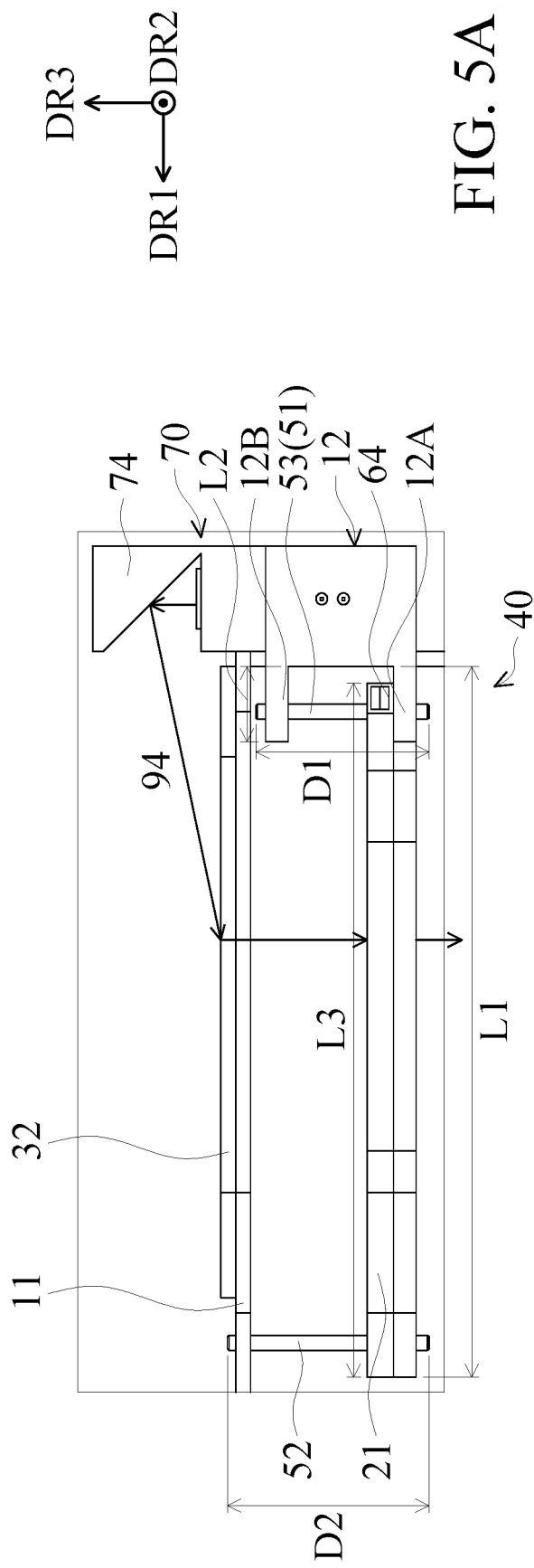

OPTICAL SYSTEM

CROSS REFERENCE TO RELATED APPLICATIONS

This application claims the benefit of U.S. Provisional Application No. 63/065,865, filed Aug. 14, 2020, the entirety of which is incorporated by reference herein.

BACKGROUND OF THE INVENTION

Field of the Invention

The present disclosure relates to an optical system.

Description of the Related Art

Augmented Reality (AR) is a technology that combines the virtual image on the monitor to real world. As the performance of mobile electronic devices increases, the usage of optical systems with AR function become more and more popular. It should be ensured that the generated image matches the focus of eyes to achieve better AR experience. However, not all current AR devices can match the requirements in all aspect.

BRIEF SUMMARY OF THE INVENTION

An optical system is provided. The optical system includes a fixed portion and a first optical assembly. The first optical assembly includes a first movable portion used for holding a first optical element, and a first driving assembly used for driving the first movable portion to move relative to the fixed portion. The fixed portion includes a first frame used for holding a second optical element, the first movable portion is movable relative to the fixed portion, and an image is projected to the second optical element.

In some embodiments, the optical system further including a reflect element disposed on the fixed portion, used for reflecting the image to the first optical element. The fixed portion includes a second frame disposed on the first frame, the second frame is used for holding a third optical element, wherein the third optical element is removable from the second frame. The first optical element includes lens. The second optical element includes lens. The third optical element includes lens. The first optical element is used for allow the image to pass through. The second optical element is used for allow light to pass through. The third optical element is used for allow the image to pass through. The third optical element is used for allow the light to pass through. The third optical element includes a neutral density filter to reduce the light flux passing through the third optical element. The third optical element includes a light filter to block light with certain wavelengths.

In some embodiments, the first frame and the second frame arranged in a first direction. The first movable portion is disposed between the first frame and the second frame. The first movable portion is movable relative to the fixed portion in the first direction. The second frame includes a first stopping portion and a second stopping portion used for defining a first maximum movable range of the first movable portion relative to the fixed portion. The first stopping portion and the second stopping portion are separated from the first frame.

In some embodiments, in a second direction that is perpendicular to the first direction, the length of the first stopping portion is greater than the length of the first movable portion. In the second direction, the length of the second stopping portion is less than the length of the first movable portion. A gap greater than zero is between the second stopping portion and the first optical element. In the first direction, at least a portion of the second optical element overlaps the second stopping portion. When the first movable portion is at a first limit positon relative to the fixed portion, the first movable portion is in contact with the first stopping portion. When the first movable portion is at a second limit positon relative to the fixed portion, the first movable portion is in contact with the second stopping portion.

In some embodiments, the optical system further includes a first circuit element disposed on the fixed portion. The first driving assembly includes a first resilient element disposed on the first movable portion, a first friction element disposed on the first resilient element, and a first driving element disposed in the first friction element and on the first circuit element. The first movable portion includes a first surface does not parallel to the first direction. A first recess is formed on the first surface. The first resilient element and the first friction element are disposed in the first recess. The first friction element is disposed between the first resilient element and the first driving element. The first friction element includes metal. The first movable portion includes plastic. The first resilient element includes plastic. The first resilient element and the first movable portion include different materials. The first optical element includes concave lens or convex lens.

In some embodiments, the optical system further includes a first guiding element disposed on the fixed portion, a second guiding element disposed on the fixed portion, a third guiding element disposed on the fixed portion, wherein the first movable portion is movably connected to the third guiding element. The first movable portion is movably connected to the first guiding element. The first movable portion is movably connected to the second guiding element. The first guiding element is column-shaped and extending in the first direction. The first guiding element is disposed on the second frame and is separate from the first frame. The first guiding element is between the first stopping portion and the second stopping portion. The second guiding element is column-shaped and extending in the first direction. The second guiding element is disposed on the first frame and the second frame. The shortest distance between the first guiding element and the first driving assembly is different than the shortest distance between the first guiding element and the second guiding element. The first guiding element and the second guiding element are parallel.

In some embodiments, in the second direction, at least a portion of the first guiding element overlaps the second guiding element. In a third direction, at least a portion of the first guiding element overlaps the first driving assembly. The third direction and the first direction are perpendicular. In the third direction, the second guiding element does not overlap the first driving assembly. In the first direction, the lengths of the first guiding element and the second guiding element are different.

In some embodiments, in the third direction, the second guiding element does not overlap the first guiding element. In the third direction, the second guiding element does not overlap the third guiding element. The third guiding element is column-shaped and extending in the first direction. In the third direction, at least a portion of the third guiding element overlaps the first driving assembly. In the third direction, at least a portion of the third guiding element overlaps the first guiding element.

In some embodiments, the shortest distance between the third guiding element and the first driving assembly is different from the shortest distance between the second guiding element and the first driving assembly. The shortest distance between the third guiding element and the first driving assembly is identical to the shortest distance between the first guiding element and the first driving assembly. The third guiding element is movably disposed in the first friction element. The first resilient element applies a first compressing force to the first friction element to allow the first friction element connects to the third guiding element by friction. The third guiding element is disposed in the first recess. In the second direction, the first movable portion, the first resilient element, the first friction element, and the third guiding element at least partially overlaps each other. The first driving element includes piezoelectric driving element. The third guiding element includes fiber.

In some embodiments, the optical system further includes a first magnetic element disposed on the first frame, a second magnetic element disposed on the second frame, and a first sensing assembly used for detecting the movement of the first movable portion relative to the fixed portion. The first sensing assembly includes a first sensing element disposed on the first circuit element, a second sensing element disposed on the first circuit element, a third sensing element disposed on the first circuit element, and a fourth sensing element disposed on the first circuit element.

In some embodiments, the first sensing element and the second sensing element are arranged in the first direction. The first sensing element, the third sensing element, and the fourth sensing element are arranged in the first direction. In the third direction, at least a portion of the first magnetic element overlaps the second magnetic element. The first movable portion further includes a second surface. The first surface and the second surface face different directions. The second surface is parallel to the first direction. A second recess is formed on the second surface. The first direction, the second direction, and the third direction are perpendicular.

In some embodiments, the optical system further includes a third magnetic element disposed in the second recess. The first sensing assembly detects magnetic field variation caused by the third magnetic element to detect the movement of the first movable portion relative to the fixed portion. The third sensing assembly and the fourth sensing assembly detect magnetic field variation caused by the third magnetic element to detect the movement of the first movable portion relative to the fixed portion; when viewed in the third direction, at least a portion of the first sensing assembly overlaps the first driving assembly; when viewed in the third direction, at least a portion of the first sensing assembly overlaps the third guiding element.

In some embodiments, the circuit element includes an electrical connecting point used for electrically connecting the first circuit element and an external circuit. At the first limit portion, the distance between the third magnetic element and the first sensing element is greater than the distance between the third magnetic element and the second sensing element. At the first limit portion, the distance between the third magnetic element and the first sensing element is greater than the distance between the third magnetic element and the third sensing element. At the first limit portion, the distance between the third magnetic element and the first sensing element is greater than the distance between the third magnetic element and the fourth sensing element.

In some embodiments, at the second limit portion, the distance between the third magnetic element and the first sensing element is less than the distance between the third magnetic element and the second sensing element. At the second limit portion, the distance between the third magnetic element and the first sensing element is less than the distance between the third magnetic element and the third sensing element. At the second limit portion, the distance between the third magnetic element and the first sensing element is less than the distance between the third magnetic element and the fourth sensing element.

In some embodiments, the optical system further includes a second optical assembly. The second optical assembly includes a second movable portion used or holding a fourth optical element, wherein the second movable portion is movable relative to the fixed portion, and a second driving assembly used for driving the second movable portion to move relative to the fixed portion. The second movable portion is movable relative to the first movable portion. The shortest distance between the first guiding element and the second optical assembly is greater than the shortest distance between the second guiding element and the second optical assembly.

In some embodiments, the optical system further includes an image processing assembly used for generating the image and a first energy storage element. The image processing assembly includes a distance measuring element used for detecting a distance between the distance measuring element and an object, a processing element electrically connected to the distance measuring element and includes a calculating unit, an image source electrically connected to the processing element and used for projecting the image, and a detecting element electrically connected to the processing element, used for detecting the condition of eyes. The first energy storage element is electrically connected to the first driving assembly through the first circuit element, used for providing energy to the first driving assembly, the first sensing assembly, and the image processing assembly.

In some embodiments, the first energy storage element includes battery. The distance measuring element provides a distance signal to the processing element based on the distance between the object and the distance measuring element. The processing element adjusts the size of the image based on the distance signal. The processing element provides an image signal to the image source based on the distance signal. The image source provides the image to the reflect element based on the image signal, so that the image is reflected by the reflect element to the second optical element. The processing element provides a first feedback signal to the first driving assembly based on a detect signal from the detecting element. The first driving assembly moves the first movable portion to a first focus position based on the first feedback signal.

In some embodiments, the fixed portion further includes a fifth frame and a sixth frame used for affixing the optical system. The fifth frame and the sixth frame includes spectacle frames. The shortest distance between the image source and the first optical element is greater than the shortest distance between the image source and the fourth optical element. The shortest distance between the distance measuring element and the first optical element is less than the shortest distance between the distance measuring element and the fourth optical element. The first focus positon is in the first maximum movable range.

In some embodiments, the fixed portion further includes a third frame, a fourth frame disposed on the third frame, a fifth optical element disposed on the third frame, and a sixth optical element disposed on the fourth frame. The fifth optical element and the sixth optical element are arranged in the first direction. The second movable portion is disposed between the third frame and the fourth frame. The second movable portion is movable relative to the fixed portion in the first direction.

In some embodiments, the fourth optical element includes convex lens or concave lens. The image source provides the image to the reflect element based on the image signal, so that the image is reflected by the reflect element to the fourth optical element. The processing element provides a second feedback signal to the second driving assembly based on the detect signal. The second driving assembly moves the second movable portion to a second focus position based on the second feedback signal.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 3A, FIG. 4A, FIG. 5A, and FIG. 6A are schematic views of the optical system viewed in different directions when the first movable portion is at a first limit position relative to the fixed portion.

FIG. 3B, FIG. 4B, FIG. 5B, and FIG. 6B are schematic views of the optical system viewed in different directions when the first movable portion is at a second limit position relative to the fixed portion.

DETAILED DESCRIPTION OF THE INVENTION

Figure 1:
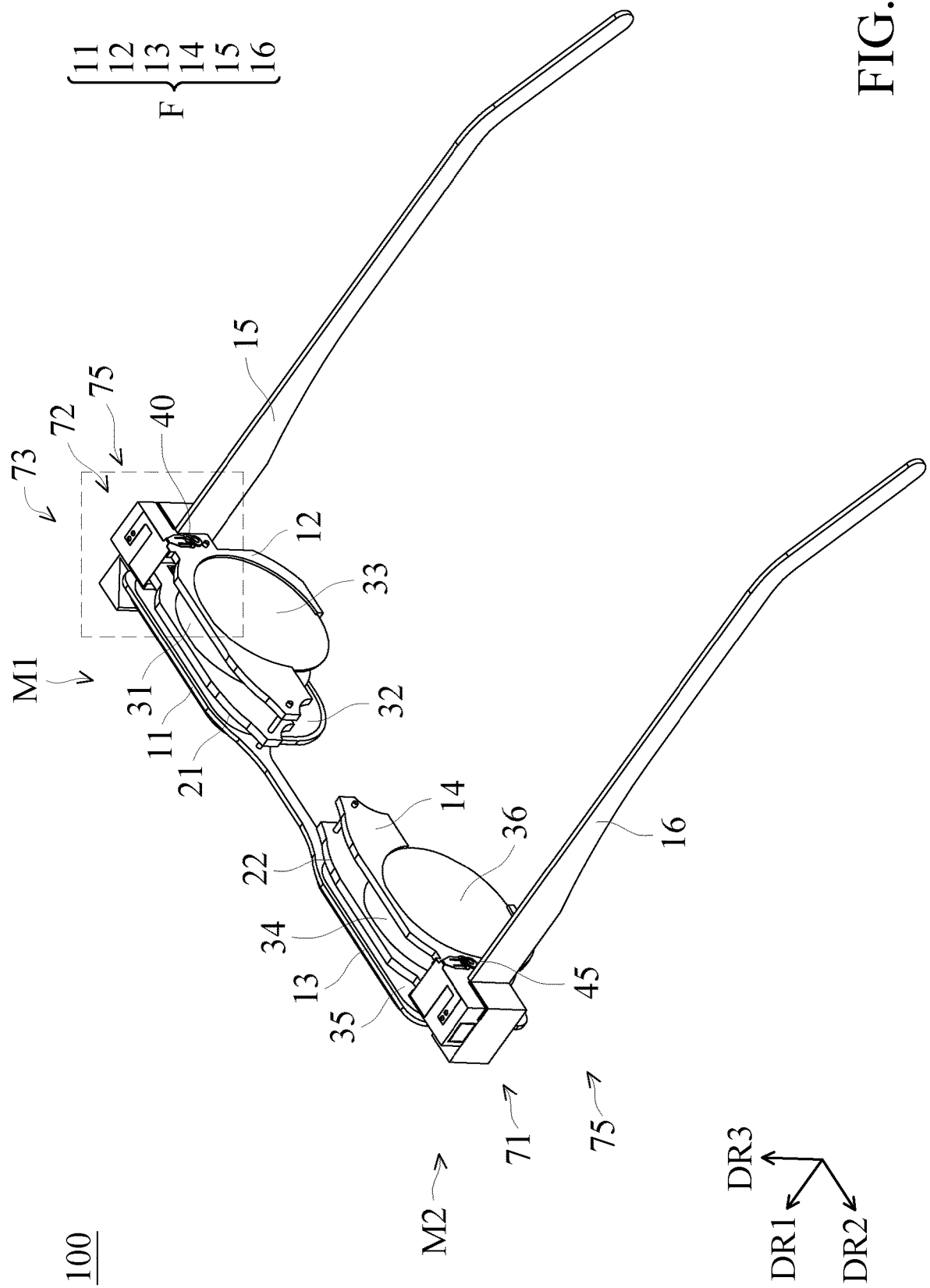
FIG. 1 is a schematic view of an optical system in some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are in direct contact, and may also include embodiments in which additional features may be disposed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are in direct contact, and may also include embodiments in which additional features may be disposed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used in the present disclosure for ease of description of one feature's relationship to another feature. The spatially relative terms are intended to cover different orientations of the device, including the features.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

In addition, in some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise.

FIG. 1 is a schematic view of an optical system 100 in some embodiments of the present disclosure. In some embodiments, the optical system 100 may be a glasses, and may include a fixed portion F (which includes a first frame 11, a second frame 12, a third frame 13, a fourth frame 14, a fifth frame 15, and a sixth frame 16), an first optical assembly M1, and an second optical assembly M2. The first optical assembly M1 may include a first movable portion 21, a first optical element 31, a second optical element 32, and a third optical element 33. The second optical assembly M2 may include a second movable portion 22, a fourth optical element 34, a fifth optical element 35, and a sixth optical element 36.

In some embodiments, the first optical element 31 and the fourth optical element 34 may include lens, such as convex lens or concave lens that can change focus of the image. The second optical element 32, the third optical element 33, the fifth optical element 35, and the sixth optical element 36 may include lens, such as flat lens, to allow light passing through. In some embodiments, the first optical assembly M1 and the second optical assembly M2 may respectively correspond to the eyes of a user to adjust the focus of the image reaching the eyes.

In some embodiments, the first optical element 31 may be disposed on the first movable portion 21, the second optical element 32 may be disposed on the first frame 11, and the third optical element 33 may be disposed on the second frame 12. The fourth optical element 34 may be disposed on the second movable portion 22, the fifth optical element 35 may be disposed on the third frame 13, and the sixth optical element 36 may be disposed on the fourth frame 14.

The fifth frame 15 may be connected to the first frame 11, and the sixth frame 16 may be connected to the third frame 13. For example, the first frame 11, the third frame 13, the fifth frame 15, and the sixth frame 16 may be formed as one piece. In some embodiments, the first frame 11 and the second frame 12 may arrange in a first direction DR1. The third frame 13 and the fourth frame 14 may arrange in the first direction DR1. In other words, the first optical element 31, the second optical element 32, and the third optical element 33 are arranged in the first direction DR1, and the fourth optical element 34, the fifth optical element 35, and the sixth optical element 36 are arranged in the first direction DR1, in accordance with some embodiments. In some embodiments, the fifth frame 15 and the sixth frame 16 may include spectacle frames to affix the optical system 100, and the user can wear the optical system 100 like wearing glasses.

In some embodiments, the first movable portion 21 may be disposed between the first frame 11 and the second frame 12. In other words, the first optical element 31 may be disposed between the second optical element 32 and the third optical element 33. In some embodiments, the second movable portion 22 may be disposed between the third frame 13 and the fourth frame 14. In other words, the fourth optical element 34 may be disposed between the fifth optical element 35 and the sixth optical element 36. Therefore, the position of the first optical element 31 between the second optical element 32 and the third optical element 33 and the position of the fourth optical element 34 between the fifth optical element 35 and the sixth optical element 36 may be changed to focus the image to eyes.

In some embodiments, the third optical element 33 and the sixth optical element 36 may be used for preventing the first optical element 31 and the fourth optical element 34 in direct contact with the eyes when moving. In some embodiments, the third optical element 33 and the sixth optical element 36 may be removed or changed based on user's requirement.

In some embodiments, the optical system 100 further includes a first driving assembly 40 and a second driving assembly 45. The first driving assembly 40 may be used for driving the first movable portion 21 to move relative to the fixed portion F (e.g. the first frame 11 and the second frame 12) to move in the first direction DR1. The second driving assembly 45 may be used for driving the second movable portion 22 to move relative to the fixed portion F (e.g. the third frame 13 and the fourth frame 14) to move in the first direction DR1. Therefore, the first optical element 31 and the fourth optical element 34 may move in the first direction DR1 relative to the fixed portion F to adjust focus. In some embodiments, the first driving assembly 40 and the second driving assembly 45 may be driven separately to match the different focal lengths of the user's eyes.

Figure 2A:
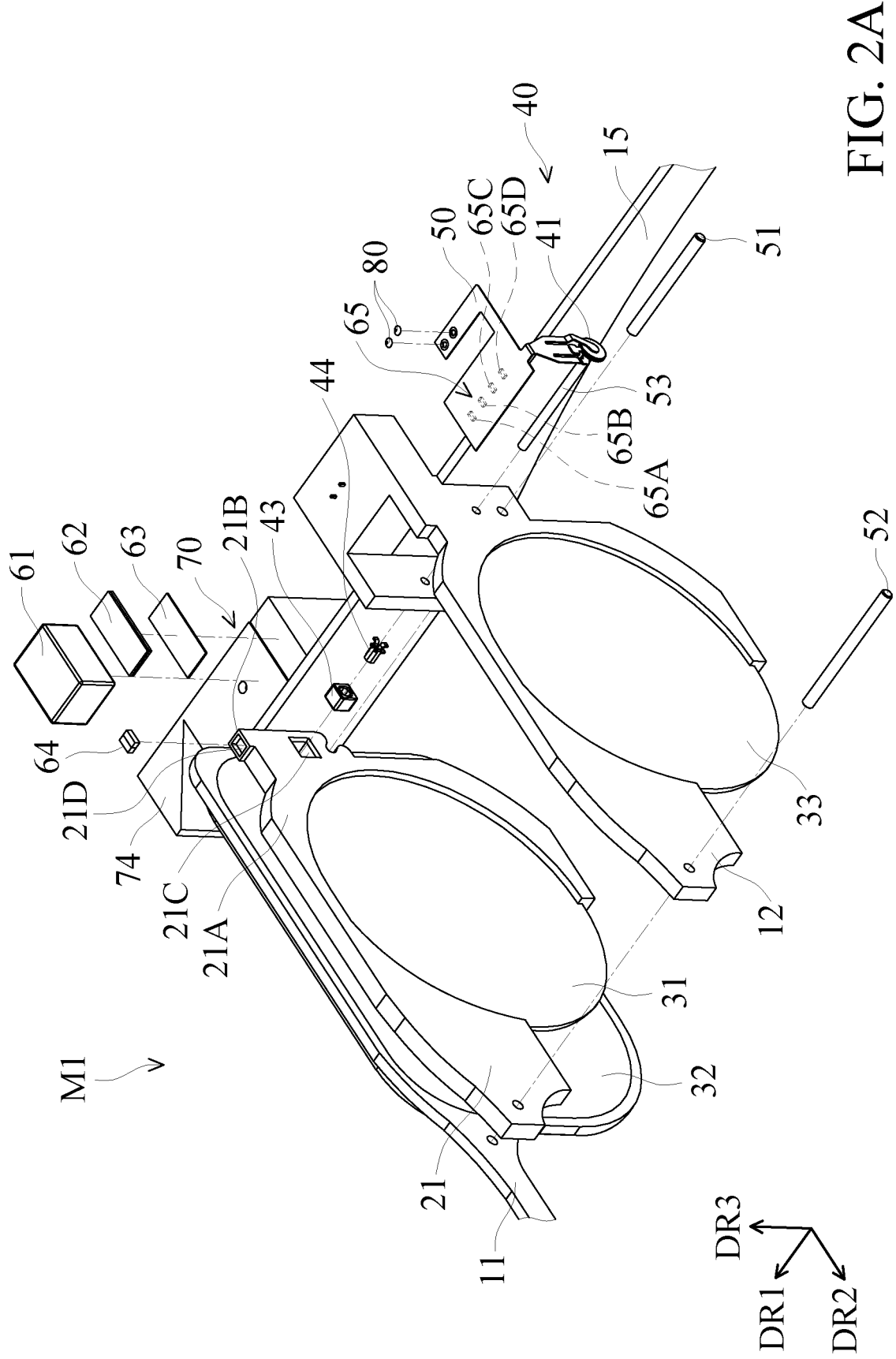
FIG. 2A is an exploded of some elements of the optical system.
Figure 2B:
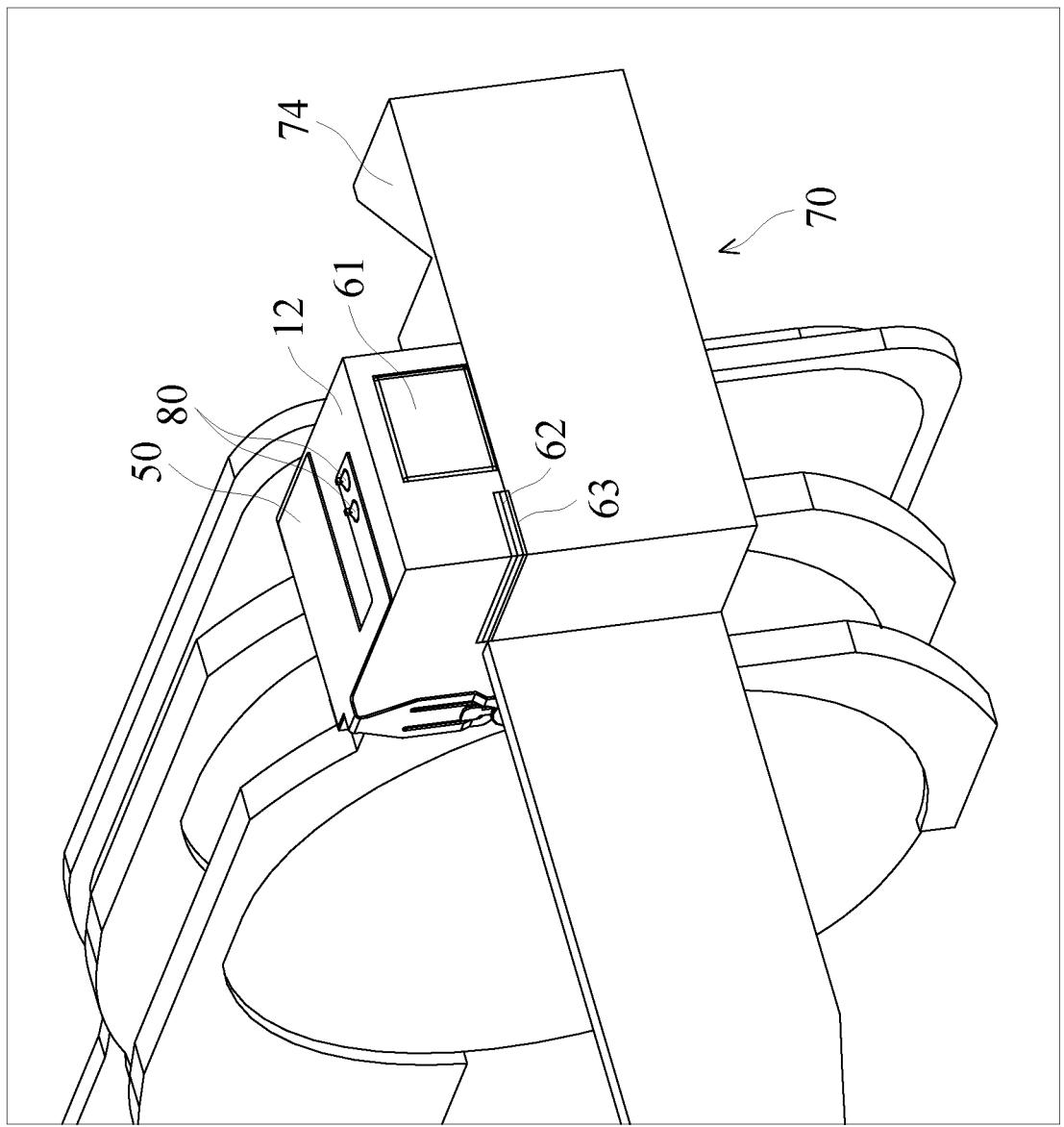
FIG. 2B is a schematic view of some elements of the optical system.
Figure 6A:
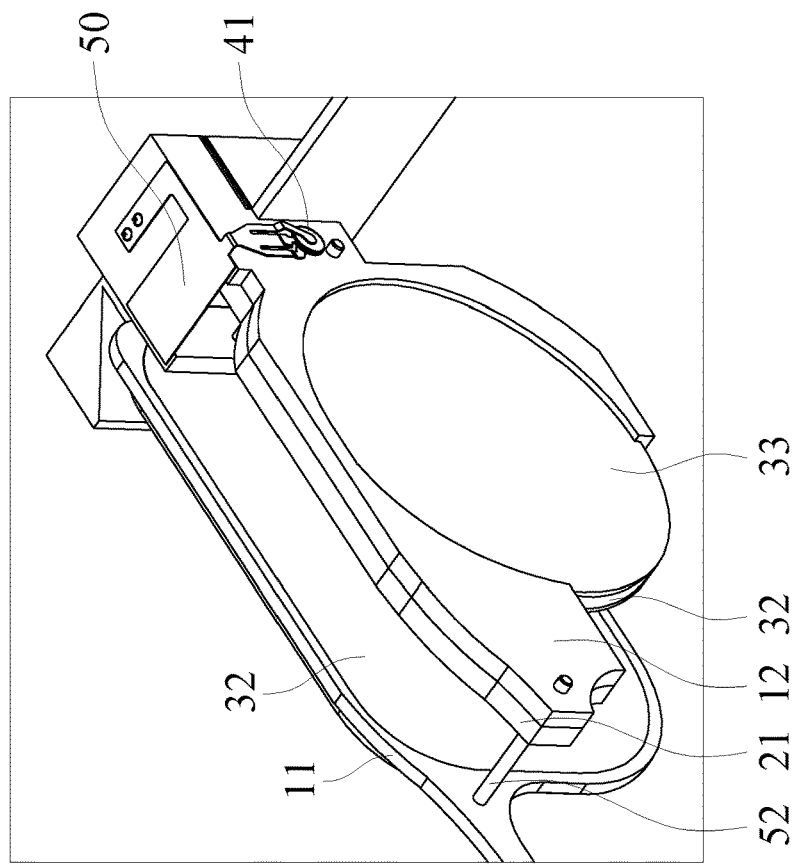
Figure 6B:
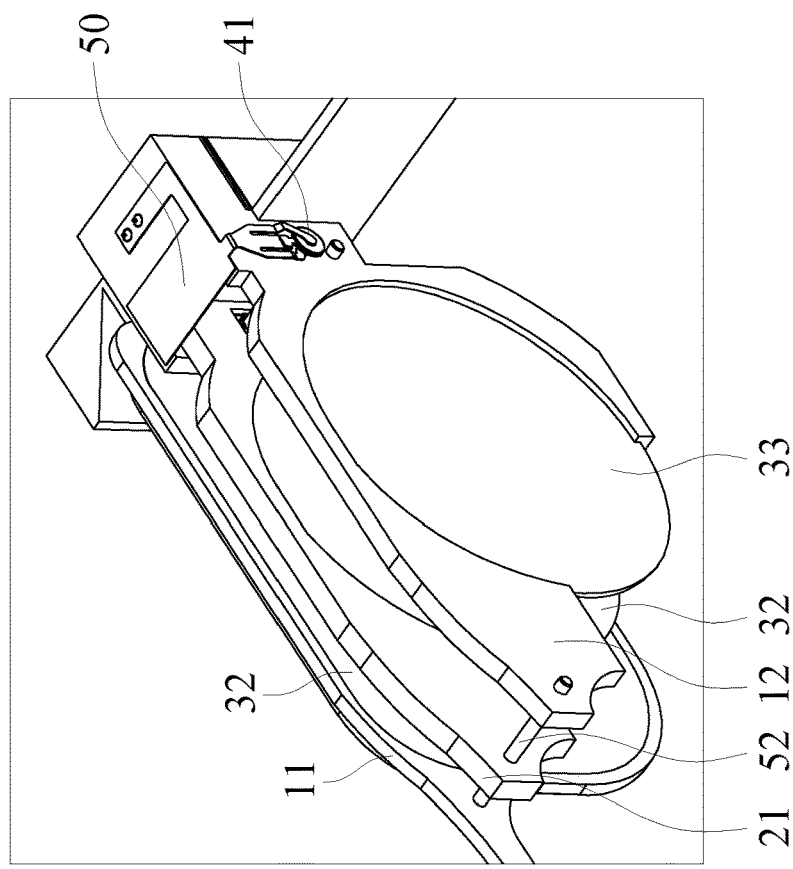

FIG. 2A is an exploded of some elements of the optical system 100. FIG. 2B is a schematic view of some elements of the optical system 100, wherein the elements at the first optical assembly M1 side are illustrated. In some embodiments, the first movable portion 21 may include a first surface 21A and a second surface 21B which face different directions. A first recess 21C is formed on the first surface 21A, and a second recess 21D is formed on the second surface 21B. The first surface 21A is not parallel to the first direction DR1, such as perpendicular. The second surface 21B is parallel to the first direction DR1, and is not parallel to the third direction DR3, such as perpendicular.

In some embodiments, the first driving assembly 40 of the optical system 100 may include a first driving element 41, a first resilient element 43, a first friction element 34, and a third guiding element 53. The first driving assembly 40 may be disposed on the fixed portion F (e.g. the second frame 12) through the first circuit element 50. For example, the first driving element 41 may connect to the first circuit element 50. The first circuit element 50 may be affixed on the second frame 12 by electrical connection point 80 (e.g. solders). The electrical connection point 80 may be used for providing electrical connection between the first circuit element 50 and an external circuit (not shown).

In some embodiments, the first driving element 41 may connect to the third guiding element 53, and the third guiding element 53 may be column-shaped and extends in the first direction DR1. An end of the third guiding element 53 may be disposed on the first driving element 41, and another end of the third guiding element 53 may pass through the second frame 12 and be surrounded by the first resilient element 43 and the first friction element 34.

The first resilient element 43 and the first friction element 34 may be disposed in the first recess 21C of the first movable portion 21. The first resilient element 43 may surround the first friction element 34 and apply a first compression force to the first friction element 34 toward the third guiding element 53. Therefore, the third guiding element 53 is movably connected to the first friction element 34 by friction contact. In some embodiments, the first movable portion 21 and the first resilient element 43 may include plastic, the first friction element 34 may include metal, and the third guiding element 53 may include carbon fiber. Moreover, the material of the first movable portion 21 and the first resilient element 43 may be different.

The first driving element 41 may include piezoelectric driving element, which can drive the third guiding element 53 to move back and forth in the first direction DR1, so the first movable portion 21 having the first friction element 34 may move in the first direction DR1. For example, if the friction between the first friction element 34 and the third guiding element 53 is less than the maximum friction when the third guiding element 53 is moving, the third guiding element 53 and the first friction element 34 will move together, so the first movable portion 21 may be moved together as well. If the friction between the first friction element 34 and the third guiding element 53 is greater than than the maximum friction when the third guiding element 53 is moving, the third guiding element 53 will move relative to the first friction element 34, so the first movable portion 21 is not moved in such situation. By move the third guiding element 53 in these two situations alternately, the first movable portion 21 may move in the first direction DR1.

In some embodiments, the first frame 11, the second frame 12, and the first movable portion 21 may be connected by the column-shaped first guiding element 51, the column-shaped second guiding element 52, and the column-shaped third guiding element 53. The first guiding element 51 and the third guiding element 53 may be affixed on the second frame 12 and separated from the first frame 11. The second guiding element 52 may be affixed on the first frame 11 and the second frame 12. The first movable portion 21 is movably connected to the first guiding element 51, the second guiding element 52, and the third guiding element 53. In some embodiments, the first guiding element 51, the second guiding element 52, and the third guiding element 53 may extend in the first direction DR1 and may be parallel to each other. Therefore, the first movable portion 21 is restricted to move in the first direction DR1. In some embodiments, a shortest distance between the first guiding element 51 and the second optical assembly M2 is greater than a shortest distance between the second guiding element 52 and the second optical assembly M2. In other words, the second optical assembly M2 is closer to the second guiding element 52 than the first guiding element 51.

In some embodiments, the optical system 100 may further include various electronic elements, such as a first energy storage element 61, a first magnetic element 62, a second magnetic element 63, a image processing assembly 70 (which includes a image source 71, a processing element 72, a distance measuring element 73, and a detecting element 75), and a reflect element 74.

The first energy storage element 61 may provide energy to operate the optical system 100, such as a battery. In some embodiments, the first energy storage element 61 may be disposed on the fixed portion F, such as disposed between the second frame 12 and the fifth frame 15, and at least a portion of the first energy storage element 61 exposes from the second frame 12. For example, the second direction DR2 and the third direction DR3 may be different from the first direction DR1 (e.g. perpendicular), and the second direction DR2 and the third direction DR3 may be different (e.g. perpendicular). In the first direction DR1 and the second direction DR2, the first energy storage element 61 does not expose from the second frame 12. In the third direction DR3, at least a portion of the first energy storage element 61 exposes from the second frame 12. In some embodiments, the first energy storage element 61 may be electrically connected to the first driving assembly 40 through the first circuit element 50, so energy can be provided to the first driving assembly 40, the first sensing assembly 65, and the image processing assembly 70 from the first energy storage element 61.

The first magnetic element 62 may be a magnet, and may be affixed on the second frame 12. The second magnetic element 63 may include ferromagnetic metal (e.g. Fe, Co, Ni, an alloy thereof, etc.), and may be affixed on the fifth frame 15. In the third direction DR3, at least a portion of the first energy storage element 61 and overlaps the first magnetic element 62 and the second magnetic element 63. Therefore, the magnetic attraction force between the first magnetic element 62 and the second magnetic element 63 allows the second frame 12 to be affixed on the fifth frame 15. Therefore, the second frame 12 may be removed easily, so the first energy storage element 61 may be replaced easily.

The image processing assembly 70 and the reflect element 74 may be disposed on the fifth frame 15, and the image source 71 may be used for providing an image 94 to the reflect element 74. The reflect element 74 then reflects the image 94 to user's eyes through the first optical element 31, the second optical element 32, and the third optical element 33. Moreover, external light may pass through the first optical element 31, the second optical element 32, and the third optical element 33 to achieve user's eyes, so augmented reality function may be achieved.

In some embodiments, the third optical element 33 or the sixth optical element 36 may include light filter or neutral density (ND) filter to reduce the light flux passing through the third optical element 33 or the sixth optical element 36, or to block light with certain wavelengths, and only allow light having other wavelengths to pass through. Therefore, the quality of the image received by eyes may be enhanced.

In some embodiments, the third magnetic element 64 (e.g. magnet) may be disposed in the second recess 21D of the first movable portion 21. The first sensing assembly 65 (includes a first sensing element 65A, a second sensing element 65B, a third sensing element 65C, and a fourth sensing element 65D) may be disposed on a side of the first circuit element 50 facing the first movable portion 21. The first sensing assembly 65 may be used for detecting the magnetic field variation caused by the third magnetic element 64 when the first movable portion 21 moves relative to the fixed portion F, so the position of the first movable portion 21 relative to the fixed portion F may be detected. The first sensing element 65A, the second sensing element 65B, the third sensing element 65C, and the fourth sensing element 65D may arrange in the first direction DR1 to detect the position of the first movable portion 21 in the first direction DR1.

Figure 7:
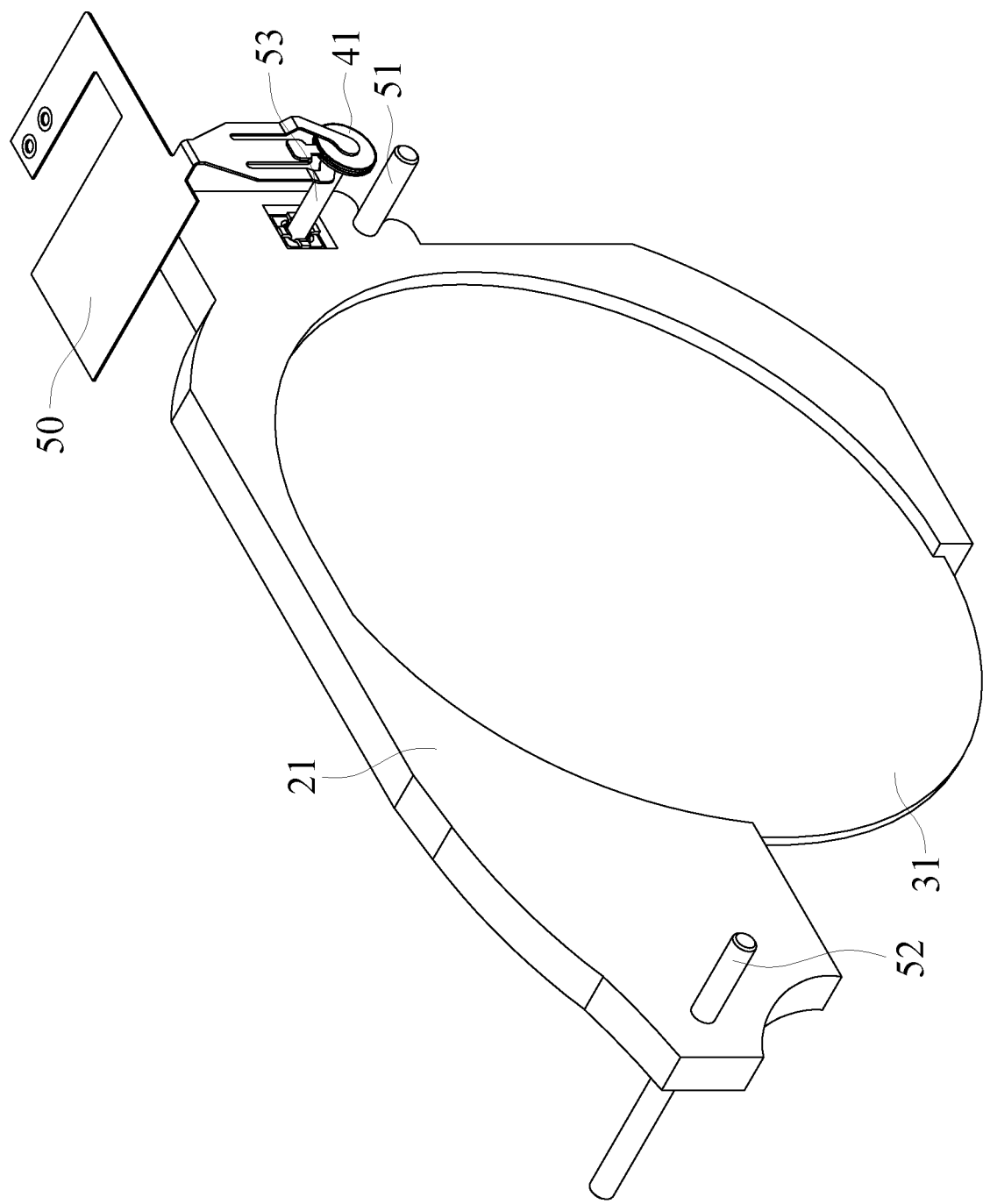
FIG. 7 is a schematic view of some elements of the optical system.
Figure 8:
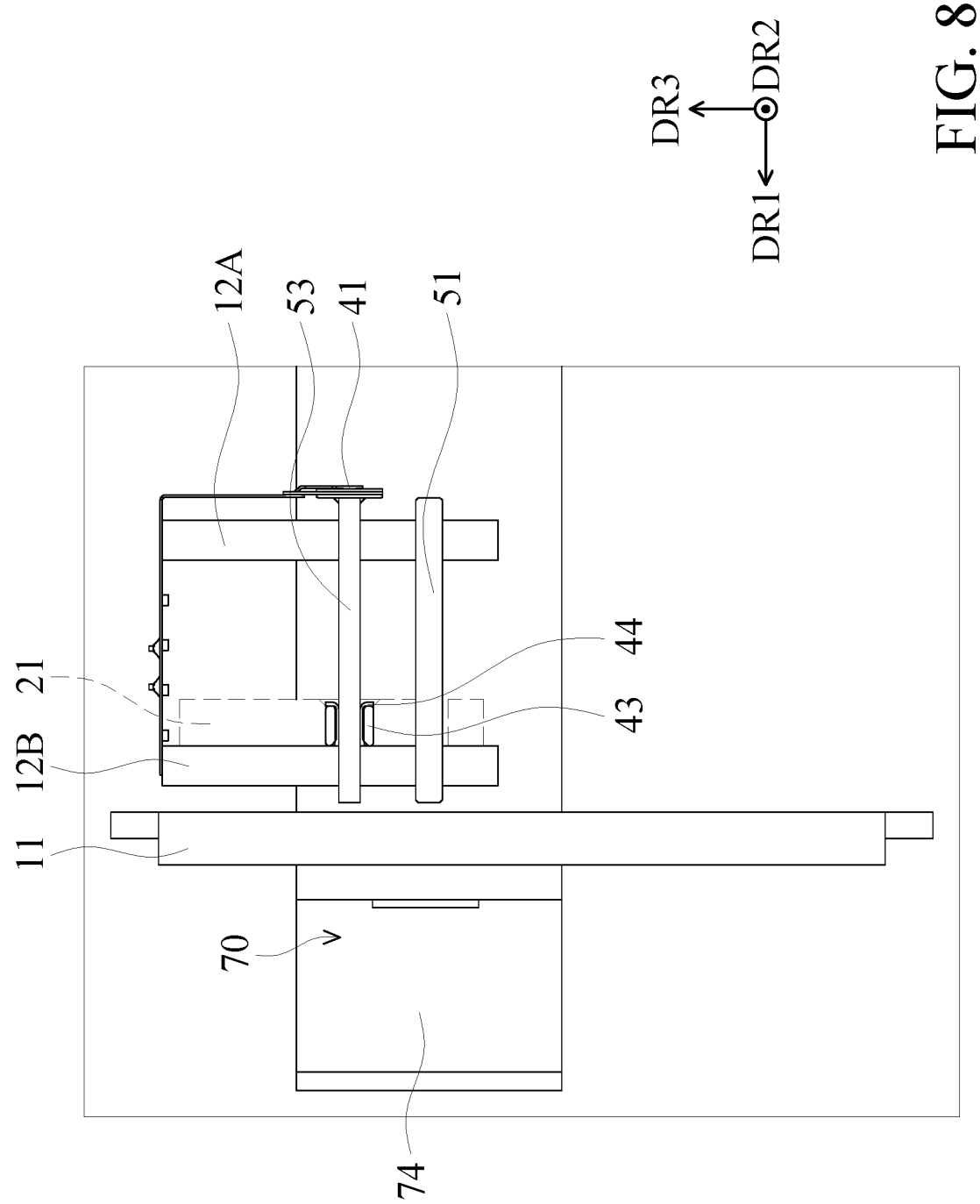
FIG. 8 is a cross-sectional view of some elements of the optical system.

FIG. 3A, FIG. 4A, FIG. 5A, and FIG. 6A are schematic views of the optical system 100 viewed in different directions when the first movable portion 21 is at a first limit position relative to the fixed portion F. FIG. 3B, FIG. 4B, FIG. 5B, and FIG. 6B are schematic views of the optical system 100 viewed in different directions when the first movable portion 21 is at a second limit position relative to the fixed portion F. FIG. 7 is a schematic view of some elements of the optical system 100. FIG. 8 is a cross-sectional view of some elements of the optical system 100.

In some embodiments, the second frame 12 may include a first stopping portion 12A and a second stopping portion 12B used for defining a first maximum movable range of the first movable portion 21 relative to the fixed portion F. In some embodiments, the first maximum movable range may be the range from the first limit position to the second limit position, and the first movable portion 21 may move between the first limit position and the second limit position. In some embodiments, the first limit position may be the position where the first movable portion 21 is in contact with the first stopping portion 12A, and the second limit position may be the portion where the first movable portion 21 is in contact with the second stopping portion 12B. Similarly, the second movable portion 22 may have a second maximum movable range relative to the fixed portion F, and is not described again.

In some embodiments, the first guiding element 51, the second guiding element 52 and the third guiding element 53 may between the first stopping portion 12A and the second stopping portion 12B. The first guiding element 51 and the third guiding element 53 may pass through the first stopping portion 12A and the first stopping portion 12A. The second guiding element 52 may pass through the first stopping portion 12A, and separate from the second stopping portion 12B. In some embodiments, the first stopping portion 12A is separated from the second stopping portion 12B and the first frame 11. In some embodiments, as shown in FIG. 5A, at least a portion of the second optical element 32 overlaps the second stopping portion 12B in the first direction DR1.

In some embodiments, the shortest distance between the first guiding element 51 and the first driving element 41 is different from the shortest distance between the first guiding element 51 and the second guiding element 52. For example, the shortest distance between the first guiding element 51 and the first driving element 41 may be less than the shortest distance between the first guiding element 51 and the second guiding element 52. In some embodiments, the shortest distance between the third guiding element 53 and the first driving assembly 40 is different from the shortest distance between the second guiding element 52 and the first driving assembly 40. For example, the shortest distance between the third guiding element 53 and the first driving assembly 40 may be less than the shortest distance between the second guiding element 52 and the first driving assembly 40. In some embodiments, the shortest distance between the third guiding element 53 and the first driving assembly 40 is identical to the shortest distance between the first guiding element 51 and the first driving assembly 40.

In some embodiments, in the second direction DR2, the first stopping portion 12A has a length L1, the second stopping portion 12B has a length L2, and the first movable portion 21 has a length L3. In the second direction DR2, the first movable portion 21, the first resilient element 43, the first friction element 34, and the first guiding element 51 at least partially overlap each other. In some embodiments, the length L1, the length L2, and the length L3 are different. For example, the length L1 may be greater than the length L3, and the length L2 may be less than the length L3.

In some embodiments, in the first limit position, at least a portion of the first movable portion 21 overlaps the fourth sensing element 65D in the third direction DR3. In the second limit position, at least a portion of the first movable portion 21 overlaps the first sensing element 65A in the third direction DR3. It should be noted that in the first maximum movable range, the first stopping portion 12A and the second stopping portion 12B do no in direct contact with the first frame 11 and the third frame 13. In other words, a distance greater than zero is between the first stopping portion 12A, the second stopping portion 12B, and the first frame 11, the first optical element 31, so the first frame 11 may be prevented from being damaged.

In some embodiments, as shown in FIG. 4A and FIG. 4B, at least a portion of the first guiding element 51 overlaps the second guiding element 52 in the second direction DR2. In some embodiments, as shown in FIG. 5A and FIG. 5B, the first driving assembly 40, the first guiding element 51, and the third guiding element 53 at least partially overlap each other in the third direction DR3, and the second guiding element 52 does not overlap the first driving assembly 40, the first guiding element 51, and the third guiding element 53 in the third direction DR3.

In the first direction DR1, the lengths of the first guiding element 51 and the second guiding element 52 are different. For example, the first guiding element 51 may have a length D1, the second guiding element 52 may have a length D2, and the length D2 may be greater than the length D1. In the third direction DR3, at least a portion of the first sensing assembly 65 overlaps the first driving assembly 40 (e.g. the third guiding element 53). Therefore, the elements are overlap in certain directions, and the size in other directions may be reduced to achieve miniaturization.

FIG. 4A and FIG. 4B show the position relationship between the third magnetic element 64 and the first sensing assembly 65. As shown in FIG. 4A, at the first limit position, the distance between the third magnetic element 64 and the first sensing element 65A is greater than the distance between the third magnetic element 64 and the second sensing element 65B, the distance between the third magnetic element 64 and the first sensing element 65A is greater than the distance between the third magnetic element 64 and the third sensing element 65C, and the distance between the third magnetic element 64 and the first sensing element 65A is greater than the distance between the third magnetic element 64 and the fourth sensing element 65D. In other words, the distance between the third magnetic element 64 and the first sensing element 65A is the farthest As shown in FIG. 4B, at the second limit position, the distance between the third magnetic element 64 and the first sensing element 65A is less than the distance between the third magnetic element 64 and the second sensing element 65B, the distance between the third magnetic element 64 and the first sensing element 65A is less than the distance between the third magnetic element 64 and the third sensing element 65C, and the distance between the third magnetic element 64 and the first sensing element 65A is less than the distance between the third magnetic element 64 and the fourth sensing element 65D. In other words, the distance between the third magnetic element 64 and the first sensing element 65A is the nearest. Therefore, the position of the first movable portion 21 (where the third magnetic element 64 is disposed on) relative to the fixed portion F may be detected, so the position of the first movable portion 21 may be controlled.

It should be noted that although the aforementioned embodiments are related to the elements close to the first optical assembly M1, the elements close to the second optical assembly M2 may have similar structures (e.g. substantially symmetry), and is not repeated again.

Figure 9:
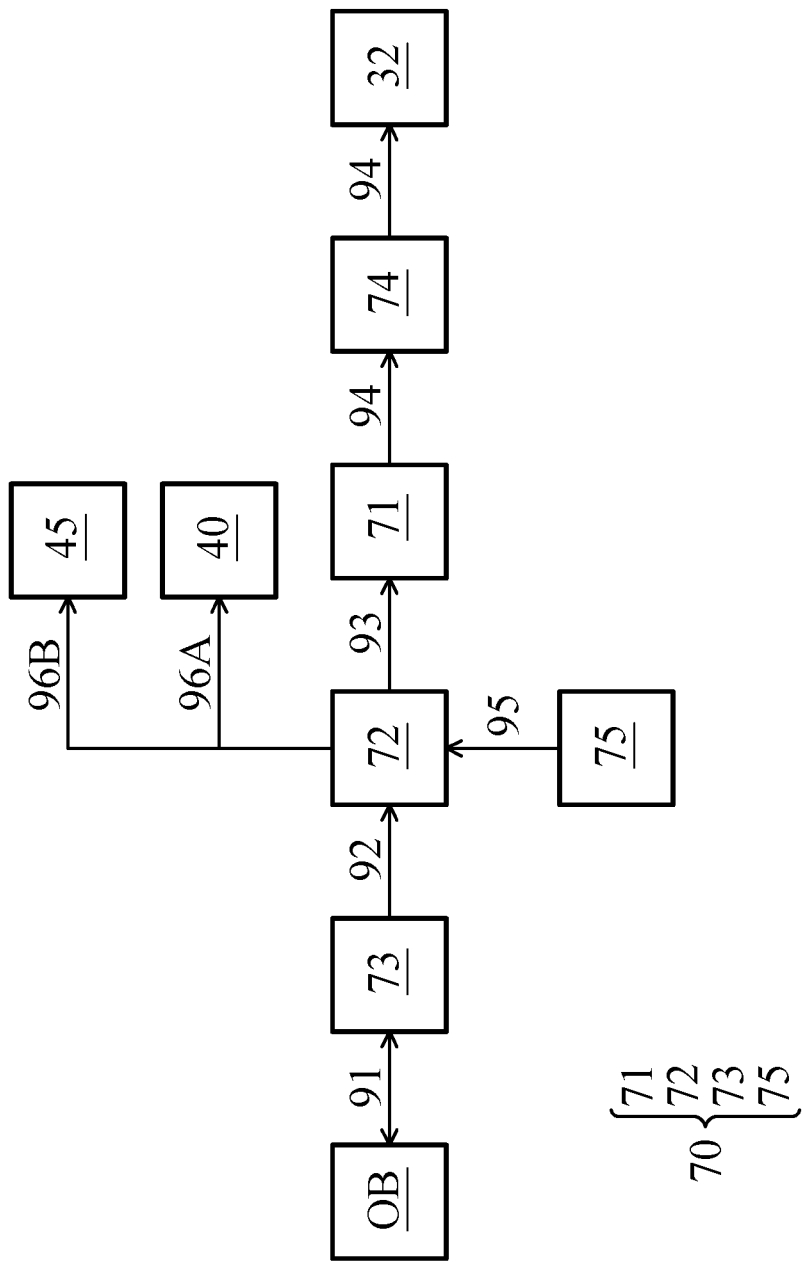
FIG. 9 is a block diagram of the image processing assembly of the optical system.

FIG. 9 is a block diagram when the image processing assembly 70 is operating. First, the distance measuring element 73 may be used for detect the distance 91 between the distance measuring element 73 and an object OB. Afterwards, the distance measuring element 73 provides a distance signal 92 to the processing element 72 based on the distance 91. The processing element 72 is electrically connected to the distance measuring element 73 and has a calculation unit to process the distance signal 92. For example, the distance signal 92 is converted to an image signal 93 by the processing element 72, and then the image signal 93 is provided to the image source 71. In some embodiments, the image source 71 is electrically connected to the processing element 72 and generates the image 94 based on the image signal 93, and then the image 94 is projected to the reflect element 74. Afterwards, the image 94 is reflected by the reflect element 74 to the second optical element 32 (or the fifth optical element 35), so that the image 94 passes through the first optical assembly M1 and the second optical assembly M2 to reach user's eyes. In some embodiments, the size of the image 94 may be adjusted by the processing element 72 based on the distance signal 92.

In some embodiments, the detecting element 75 may be electrically connected to the processing element 72 to detect the condition of user's eyes, such as the size of the pupils. Therefore, the focus of the eyes may be received to determine the way of projecting the image 94. For example, the detecting element 75 detects the condition of eyes, and then provides the detecting signal 95 to the processing element 72 based on the condition. The processing element 72 provides a first feedback signal 96A to the first driving assembly 40 and provides a second feedback signal 96B to the second driving assembly 45 based on the detecting signal 95 provided by the detecting element 75.

It should be noted that the detecting signal 95 may include information of different eyes, and the first feedback signal 96A and the second feedback signal 96B may respectively include information of different eyes. The first driving assembly 40 moves the first movable portion 21 to a first focus position based on the first feedback signal 96A. The second driving assembly 45 moves the second movable portion 22 to a second focus position based on the second feedback signal 96B. In other words, the first movable portion 21 and the second movable portion 22 may be driven separately by the image processing assembly 70 based on the condition of different eyes to achieve better display performance. It should be noted that the first focus position is in the first maximum movable range, and the second focus position is in the second maximum movable range.

In some embodiments, as shown in FIG. 1, the shortest distance between the image source 71 and the first optical element 31 is greater than the shortest distance between the image source 71 and the fourth optical element 34, and the shortest distance between the distance measuring element 73 and the first optical element 31 is greater than the shortest distance between the distance measuring element 73 and the fourth optical element 34. In other words, the image source 71 and the distance measuring element 73 may be disposed at the positions corresponding to different eyes to perform different functions in different positions.

In summary, an optical system is provided in some embodiments. The optical system includes a fixed portion and a first optical assembly. The first optical assembly includes a first movable portion used for holding a first optical element, and a first driving assembly used for driving the first movable portion to move relative to the fixed portion. The fixed portion includes a first frame used for holding a second optical element, the first movable portion is movable relative to the fixed portion, and an image is projected to the second optical element. In this way, the image projected to the user's eyes can be controlled to achieve the function of augmented reality. The special relative position and size relationship of the components disclosed in this disclosure allows the optical system to achieve a thin profile in specific directions and minimize the whole structure.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical system, comprising:
a fixed portion; and
a first optical assembly, comprising:
a first movable portion used for holding a first optical element; and
a first driving assembly used for driving the first movable portion to move relative to the fixed portion, wherein the fixed portion comprises a first frame used for holding a second optical element and a second frame disposed on the first frame, the first movable portion is movable relative to the fixed portion, and an image is projected to the second optical element, the second frame is used for holding a third optical element, the third optical element is removable from the second frame; and
a reflect element disposed on the fixed portion and used for reflecting the image to the first optical element.

2. The optical system as claimed in claim 1, wherein:
the first optical element comprises lens;
the second optical element comprises lens;
the third optical element comprises lens;
the first optical element is used for allowing the image to pass through;
the second optical element is used for allowing light to pass through;
the third optical element is used for allowing the image to pass through;
the third optical element is used for allowing the light to pass through;
the third optical element comprises a neutral density filter to reduce a light flux passing through the third optical element;
the third optical element comprises a light filter to block light with certain wavelengths.

3. The optical system as claimed in claim 2, wherein:
the first frame and the second frame are arranged in a first direction;
the first movable portion is disposed between the first frame and the second frame;
the first movable portion is movable relative to the fixed portion in the first direction;
the second frame comprises a first stopping portion and a second stopping portion used for defining a first maximum movable range of the first movable portion relative to the fixed portion;
the first stopping portion and the second stopping portion are separated from the first frame.

4. The optical system as claimed in claim 3, wherein:
in a second direction that is perpendicular to the first direction, a length of the first stopping portion is greater than a length of the first movable portion;
in the second direction, a length of the second stopping portion is less than the length of the first movable portion;
a gap greater than zero is between the second stopping portion and the first optical element;
in the first direction, at least a portion of the second optical element overlaps the second stopping portion;
when the first movable portion is at a first limit position relative to the fixed portion, the first movable portion is in contact with the first stopping portion;
when the first movable portion is at a second limit position relative to the fixed portion, the first movable portion is in contact with the second stopping portion.

5. The optical system as claimed in claim 4, further comprising a first circuit element disposed on the fixed portion;
wherein:
the first driving assembly comprises:
a first resilient element disposed on the first movable portion;
a first friction element disposed on the first resilient element; and
a first driving element disposed in the first friction element and on the first circuit element;
the first movable portion comprises a first surface being not parallel to the first direction;
a first recess is formed on the first surface;
the first resilient element and the first friction element are disposed in the first recess;
the first friction element is disposed between the first resilient element and the first driving element;
the first friction element comprises metal;
the first movable portion comprises plastic;
the first resilient element comprises plastic;

the first resilient element and the first movable portion comprise different materials;

the first optical element comprises concave lens or convex lens.

6. The optical system as claimed in claim 5, further comprising:
a first guiding element disposed on the fixed portion, wherein the first movable portion is movably connected to the first guiding element;
a second guiding element disposed on the fixed portion, wherein the first movable portion is movably connected to the second guiding element;
a third guiding element disposed on the fixed portion, wherein the first movable portion is movably connected to the third guiding element;
wherein:
the first guiding element is column-shaped and extending in the first direction;
the first guiding element is disposed on the second frame and is separate from the first frame;
the first guiding element is between the first stopping portion and the second stopping portion;
the second guiding element is column-shaped and extending in the first direction;
the second guiding element is disposed on the first frame and the second frame;
the shortest distance between the first guiding element and the first driving assembly is different than the shortest distance between the first guiding element and the second guiding element;
the first guiding element and the second guiding element are parallel.

7. The optical system as claimed in claim 6, wherein:
in the second direction, at least a portion of the first guiding element overlaps the second guiding element;
in a third direction, at least a portion of the first guiding element overlaps the first driving assembly;
the third direction and the first direction are perpendicular;
in the third direction, the second guiding element does not overlap the first driving assembly;
in the first direction, lengths of the first guiding element and the second guiding element are different.

8. The optical system as claimed in claim 7, wherein:
in the third direction, the second guiding element does not overlap the first guiding element;
in the third direction, the second guiding element does not overlap the third guiding element;
the third guiding element is column-shaped and extending in the first direction;
in the third direction, at least a portion of the third guiding element overlaps the first driving assembly;
in the third direction, at least a portion of the third guiding element overlaps the first guiding element.

9. The optical system as claimed in claim 8, wherein:
the shortest distance between the third guiding element and the first driving assembly is different from the shortest distance between the second guiding element and the first driving assembly;
the shortest distance between the third guiding element and the first driving assembly is identical to the shortest distance between the first guiding element and the first driving assembly;
the third guiding element is movably disposed in the first friction element;
the first resilient element applies a first compressing force to the first friction element to allow the first friction element to connect to the third guiding element by friction;
the third guiding element is disposed in the first recess;
in the second direction, the first movable portion, the first resilient element, the first friction element, and the third guiding element at least partially overlaps each other;
the first driving element comprises a piezoelectric driving element;
the third guiding element comprises a fiber.

10. The optical system as claimed in claim 9, further comprising:
a first magnetic element disposed on the first frame;
a second magnetic element disposed on the second frame;
a first sensing assembly used for detecting a movement of the first movable portion relative to the fixed portion, comprising:
a first sensing element disposed on the first circuit element;
a second sensing element disposed on the first circuit element;
a third sensing element disposed on the first circuit element; and
a fourth sensing element disposed on the first circuit element.

11. The optical system as claimed in claim 10, wherein:
the first sensing element and the second sensing element are arranged in the first direction;
the first sensing element, the third sensing element, and the fourth sensing element are arranged in the first direction;
in the third direction, at least a portion of the first magnetic element overlaps the second magnetic element;
the first movable portion further comprises a second surface;
the first surface and the second surface face different directions;
the second surface is parallel to the first direction;
a second recess is formed on the second surface;
the first direction, the second direction, and the third direction are perpendicular.

12. The optical system as claimed in claim 11, further comprising a third magnetic element disposed in the second recess;
wherein:
the first sensing assembly detects a magnetic field variation caused by the third magnetic element to detect the movement of the first movable portion relative to the fixed portion;
the third sensing assembly and the fourth sensing assembly detect the magnetic field variation caused by the third magnetic element to detect the movement of the first movable portion relative to the fixed portion;
when viewed in the third direction, at least a portion of the first sensing assembly overlaps the first driving assembly;
when viewed in the third direction, at least a portion of the first sensing assembly overlaps the third guiding element.

13. The optical system as claimed in claim 12, wherein:
the circuit element comprises an electrical connecting point used for electrically connecting the first circuit element and an external circuit;
at the first limit portion, a distance between the third magnetic element and the first sensing element is greater than a distance between the third magnetic element and the second sensing element;
at the first limit portion, the distance between the third magnetic element and the first sensing element is greater than a distance between the third magnetic element and the third sensing element;
at the first limit portion, the distance between the third magnetic element and the first sensing element is greater than a distance between the third magnetic element and the fourth sensing element.

14. The optical system as claimed in claim 13, wherein:
at the second limit portion, the distance between the third magnetic element and the first sensing element is less than the distance between the third magnetic element and the second sensing element;
at the second limit portion, the distance between the third magnetic element and the first sensing element is less than the distance between the third magnetic element and the third sensing element;
at the second limit portion, the distance between the third magnetic element and the first sensing element is less than the distance between the third magnetic element and the fourth sensing element.

15. The optical system as claimed in claim 14, further comprising a second optical assembly, comprising:
a second movable portion used or holding a fourth optical element, wherein the second movable portion is movable relative to the fixed portion; and
a second driving assembly used for driving the second movable portion to move relative to the fixed portion;
wherein:
the second movable portion is movable relative to the first movable portion;
the shortest distance between the first guiding element and the second optical assembly is greater than the shortest distance between the second guiding element and the second optical assembly.

16. The optical system as claimed in claim 15, further comprising:
an image processing assembly used for generating the image, comprising:
a distance measuring element used for detecting a distance between the distance measuring element and an object;
a processing element electrically connected to the distance measuring element and comprises a calculating unit;
an image source electrically connected to the processing element and used for projecting the image; and
a detecting element electrically connected to the processing element, used for detecting a condition of eyes; and
a first energy storage element electrically connected to the first driving assembly through the first circuit element, used for providing energy to the first driving assembly, the first sensing assembly, and the image processing assembly.

17. The optical system as claimed in claim 16, wherein:
the first energy storage element comprises a battery;
the distance measuring element provides a distance signal to the processing element based on the distance between the object and the distance measuring element;
the processing element adjusts a size of the image based on the distance signal;
the processing element provides an image signal to the image source based on the distance signal;
the image source provides the image to the reflect element based on the image signal, so that the image is reflected by the reflect element to the second optical element;
the processing element provides a first feedback signal to the first driving assembly based on a detect signal from the detecting element;
the first driving assembly moves the first movable portion to a first focus position based on the first feedback signal.

18. The optical system as claimed in claim 17, wherein the fixed portion further comprises a fifth frame and a sixth frame used for affixing the optical system;
wherein:
the fifth frame and the sixth frame comprise spectacle frames;
the shortest distance between the image source and the first optical element is greater than the shortest distance between the image source and the fourth optical element;
the shortest distance between the distance measuring element and the first optical element is less than the shortest distance between the distance measuring element and the fourth optical element;
the first focus position is in the first maximum movable range.

19. The optical system as claimed in claim 18, wherein the fixed portion further comprises:
a third frame;
a fourth frame disposed on the third frame;
a fifth optical element disposed on the third frame; and
a sixth optical element disposed on the fourth frame;
wherein:
the fifth optical element and the sixth optical element are arranged in the first direction;
the second movable portion is disposed between the third frame and the fourth frame;
the second movable portion is movable relative to the fixed portion in the first direction.

20. The optical system as claimed in claim 19, wherein:
the fourth optical element comprises convex lens or concave lens;
the image source provides the image to the reflect element based on the image signal, so that the image is reflected by the reflect element to the fourth optical element;
the processing element provides a second feedback signal to the second driving assembly based on the detect signal;
the second driving assembly moves the second movable portion to a second focus position based on the second feedback signal.

* * * * *